United States Patent [19]

Sjovall

[11] 4,207,949
[45] Jun. 17, 1980

[54] MACHINE FOR THE ROOT-PRUNING OF PLANTS GROWING IN ROWS

[75] Inventor: Stig L. Sjövall, Kävlinge, Sweden

[73] Assignee: Skogsstyrelsen, Jönköping, Sweden

[21] Appl. No.: 891,619

[22] Filed: Mar. 30, 1978

[51] Int. Cl.² .............................................. A01B 39/12
[52] U.S. Cl. ....................................... 172/68; 172/60; 172/118
[58] Field of Search ...................... 172/48, 54, 60, 68, 172/195, 165, 166, 145, 118, 121, 720, 752, 40, 768, 175

[56] References Cited

U.S. PATENT DOCUMENTS

| | | | |
|---|---|---|---|
| 774,254 | 11/1904 | Klamfoth | 172/752 X |
| 801,601 | 10/1905 | Morrow | 172/166 |
| 1,310,569 | 7/1919 | Holforty | 172/720 |
| 1,360,775 | 11/1920 | Moore | 172/752 X |
| 1,633,232 | 6/1927 | Sievers | 172/720 |
| 2,199,674 | 5/1940 | Ronning | 172/720 X |
| 2,438,598 | 3/1948 | Bell | 172/165 |
| 3,747,686 | 7/1973 | Beck | 172/40 X |
| 3,799,079 | 3/1974 | Dietrich | 172/145 X |
| 3,967,564 | 7/1976 | Emling | 172/145 X |
| 4,102,403 | 7/1978 | Steinberg | 172/40 |

FOREIGN PATENT DOCUMENTS

| | | | |
|---|---|---|---|
| 598547 | 9/1925 | France | 172/166 |
| 767411 | 5/1934 | France | 172/40 |
| 64566 | 6/1955 | France | 172/166 |
| 192525 | 2/1967 | U.S.S.R. | 172/40 |

Primary Examiner—Paul E. Shapiro
Attorney, Agent, or Firm—Trexler, Wolters, Bushnell & Fosse, Ltd.

[57] ABSTRACT

A machine is provided for the root-pruning of plants growing in rows, such that the root system of the plants will be small in circumference but finely-branched. The machine has, for each plant row, a knife unit for forming a groove in the ground and root-pruning the plants. Each knife unit comprises a first and second knife, wherein the first knife is forward of the second knife and lies in a vertical plane parallel to the direction of travel of the machine. The second knife has a cutting blade comprising a substantially vertical blade portion and a substantially horizontal blade portion. The first and second knives are rigidly interconnected and arranged for reciprocatory movement in a direction parallel to the direction of travel of the machine. A compactor is disposed behind the second knife for reclosing the groove made in the ground by the knife unit.

8 Claims, 3 Drawing Figures

MACHINE FOR THE ROOT-PRUNING OF PLANTS GROWING IN ROWS

The present invention relates to a machine for the root-pruning of plants growing in rows, such that the root system of the plants will be small in circumference but finely-branched, the machine having for each plant row a knife unit with mobile knives, of which a first knife lies in a vertical plane parallel to the direction of travel of the machine, and a second knife has a substantially vertical portion and a substantially horizontal portion.

In the nursing of plants which are later to be planted-out at a permanent locality it is desirable, for at least two reasons, that the root system of the plants be small in circumference but well-developed and finely-branched. Firstly, such a root system entails that the final planting can be effected with a very high probability of survival for the plants, since such a root system has a large number of fine, nutrient-absorbing roots of the type which, in an unpruned root system, in primarily to be found at the peripheral portions of the root system. Secondly, in machine-lifting of the plants, long, uppruned roots have a tendency to become entangled in the lifting machine or prematurely to pull up adjacent plants so that these cannot be grasped by the lifting members of the machine.

The object of the present invention is to provide a machine of the type disclosed by way of introduction, the machine being designed to carry out, rapidly and without operational trouble, root-pruning of the plants so that the plants can develop the intended root system.

According to a major aspect of the present invention, the knives of the knife unit are rigidly interconnected and consist of a leading knife with one edge, the knife being reciprocatory in its longitudinal direction, and a main knife which is provided with the substantially vertical and horizontal knife portions which are exclusively reciprocatory in a direction of movement parallel to the direction of travel of the vehicle and substantially at right angles to the longitudinal directions of the edges of the knive portions. Moreover, a compactor is disposed after the main knife, the compactor reclosing the groove made in the ground by the knife unit.

The nature of the present invention and its objects will be more readily understood from the following brief description of the accompanying drawings, and discussion relating thereto.

Figure 1:
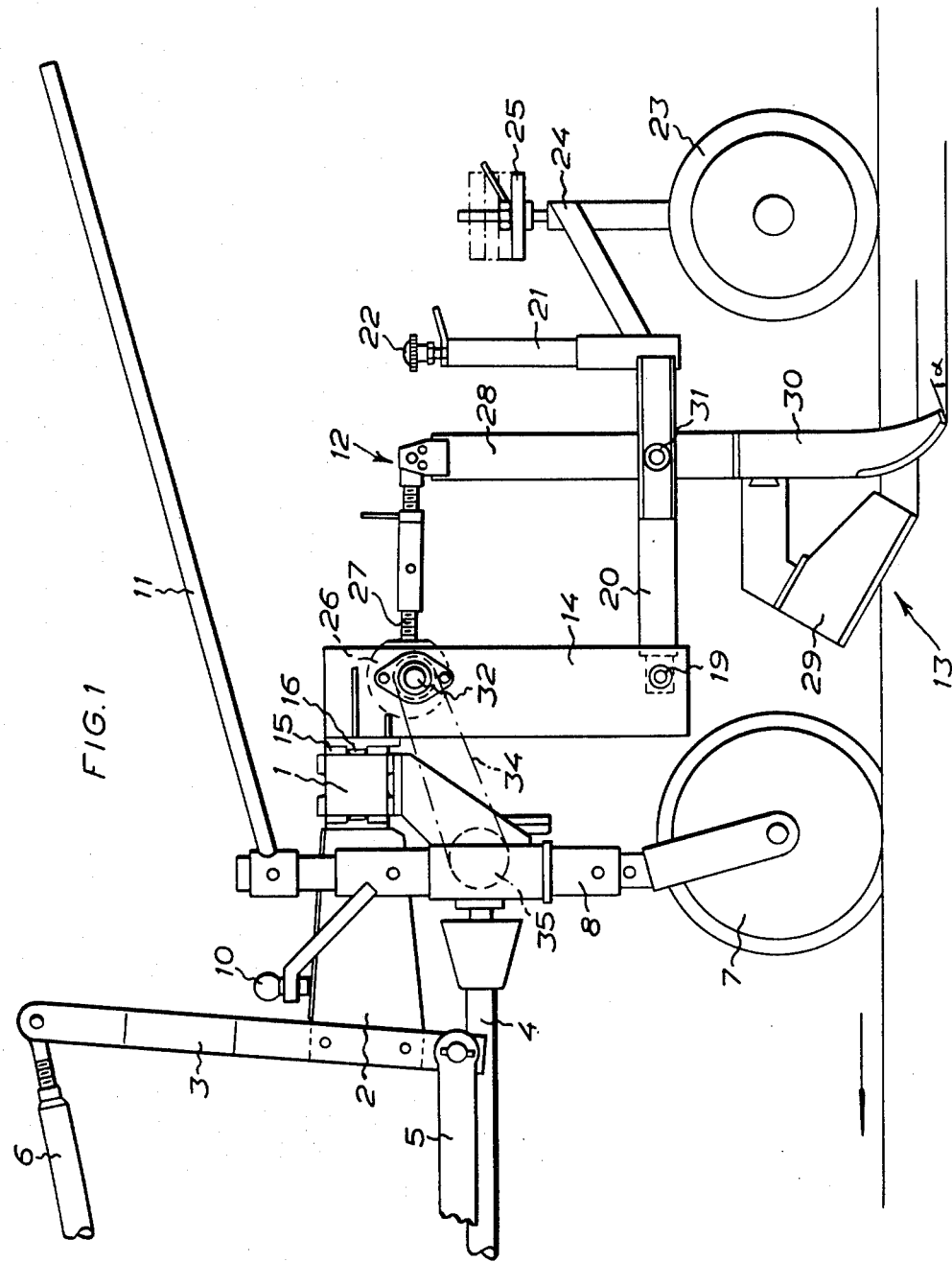
FIG. 1 is a side elevation of the machine according to the invention.

As will be apparent from the drawings, the machine is built up around a horizontal, transversely directed frame member 1 from which extend forwardly two supporting brackets 2 which are connected with their forward ends to a conventional three-point hitch 3. To permit towing, the machine is connected to a tractor by means of the tractor drawbars 5, lift rod 6 and power take-off 4. The frame member 1 is supported at a definite height above the ground and laterally steered by two steerable front wheels 7, whose wheel forks 8 are pivotally mounted in fastening arms 9 projecting obliquely downwardly-forwardly from the frame member 1. A steering rod 11 is fixed in the upper end of one fork 8, by means of which rod the fork can be swung about a substantially vertical pivot axis. Furthermore, the two forks 8 are interconnected by means of a steering tie rod 10 which transfers the steering movements of the steering rod from one fork to the other.

Figure 2:
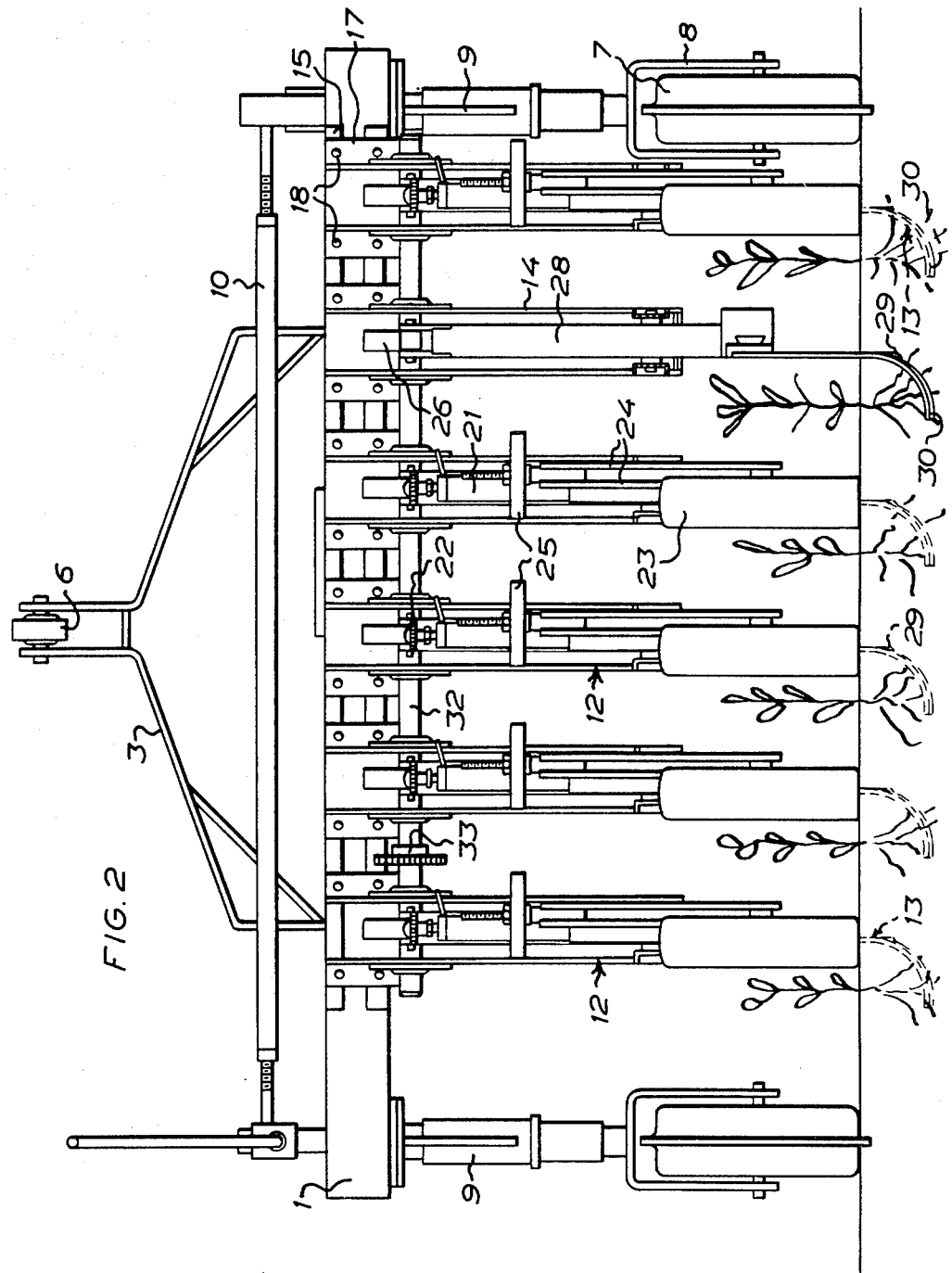
FIG. 2 is a rear view of the machine, certain details having been omitted for greater clarity.

A number of pruning assemblies 12 is disposed behind the transversely extending frame member 1 and fixed therein. As is apparent from FIG. 2, the machine in the illustrated embodiment has six identical pruning assemblies 12 and the machine can thus root-prune six plant rows simultaneously. Naturally, tha machine may also be provided with a different number of pruning assemblies, being thus designed for pruning a greater or lesser number of plant rows simultaneously.

One upper and one lower guide element 15 are disposed on the rear side of the frame member 1 to facilitate fixation of the pruning assemblies 12. These guide elements are parallel with each other and with the upper and lower sides of the frame member, respectively. In order to permit fixation, each pruning assembly 12 has, at its upper end, a vertical and transversely directed fixation plate which, at its forward end, has a horizontal guide element 16 whose dimensions are such that it fits in between the guide elements 15 on the rear side of the frame member 1. The fixation plates 17 and thus, the pruning assemblies 12 are fixedly screwed by means of screws 18 to the transverse frame member 1. In this instance, the transverse frame member 1 is provided with several different series of threaded holes which are spaced such mutual distances apart that the pruning assemblies 12 can be so placed in relation to each other that they are correctly aligned with the plant rows generally irrespective of the row spacing.

Like the pruning assemblies 12, the fastening arms 9 of the steerable front wheels 7 are disposed in such a manner that they can be moved laterally, whereby the track gauge of the machine is adaptable to a certain row spacing or to a certain width of the bed in which the plants are growing. In order to permit this change of the track gauge, the fastening arms 9 can be anchored in the transverse frame member 1 in many different ways, but they are suitably fixed to the underside of the frame member in the same manner as the pruning assemblies 12 are fixed to the rear side thereof.

As is particularly clearly apparent from FIG. 1, each pruning assembly 12 has a vertical frame portion 14 of U-shaped cross-section which is open rearwardly and has a gently rounded forwardly facing bottom. The fixation plate 17 of the pruning assembly is located in the upper forwardly facing end of the vertical frame portion 14. Two bearing bushings 19 are disposed in the lower end of the vertical frame portion 14 on the inside, the bushings being coaxial and their common central axis being horizontal and at right angles to the direction of travel of the machine. A journal is pivotally accommodated in these bearing bushings and is rigidly connected to the forward end of a vertically adjustable, rearwardly directed arm 20. As a result, the arm 20 will permit being pivoted in a vertical plane parallel to the direction of travel of the machine. An adjustment device 21 is rigidly fixed at the rear end of the arm 20. This adjustment device 21, which is disposed substantially vertically, serves for vertical adjustment of the arm 20 in relation to that wheel 23 which supports the rear end of the arm. The wheel 23 is connected to the adjustment device 21 by the intermediary of a rearwardly directed arm 24 which is anchored with its forward end in the adjustment device such that the arm can be pivoted through a certain angular range about a vertical axis extending through its forward end. Because of the pivotability of the rearwardly directed arm 24, the wheel 23 will not prevent steering of the machine laterally. A device, located straight above the wheel 23 on the rearwardly directed arm 24, is provided for the fixation of one or more weights 25 whose object will be described below. The adjustment device 21 is provided internally with a screw which, by means of an adjustment knob 22, realizes vertical adjustment of the rearwardly directed arm with the wheel 23 in relation to the arm 20.

A drive mechanism 26 is disposed at the upper end of the vertical frame portion 14. In this drive mechanism is anchored a rearwardly directed connecting arm 27 which can be put in reciprocatory motion by the drive mechanism. The rear end of the connecting arm is connected by the intermediary of a linkage to the upper end of knife support 28 which is designed as a substantially vertical rod. Furthermore, the knife support 28 is, at a lower portion, connected by means of a linkage 31 to the vertically adjustable arm 20 but extends beneath said arm and has, at its lower end, fixing means for the knife unit 13 of the pruning assembly 12. The length the connecting rod 27, the upper portion of the knife support 28, the portion of the arm 20 connecting the knife support with the vertical frame portion 14, and the distance between the bearing bushing 19 and the drive mechanism 26 in the vertical frame portion 14 are such that said parts together form a parallelogram suspension for the knife unit 13. As a result, the knife unit 13 is movable in a vertical sense without any change in its other orientation relative to the ground. The adjustment of the height position of the knife unit 13 relative to the ground, that is, its cutting depth, is realized by means of the adjustment knob 22. To ensure that the knife unit actually works at the cutting depth intended, the rearwardly directed arm 24 is loaded with a suitable number of weights 25 which also have the purpose of subjecting the wheel 23 running straight above the groove in the ground, which has been produced by the knife unit 13, to such a load that the groove in the ground is closed, whereby water loss and desiccation of the portions of the soil adjacent to the groove are avoided.

As is particularly clearly apparent from FIG. 1, the knife unit 13 comprises a first or leading knife 29 and a rear or main knife 30. Both of these knives are secured by dovetail fastenings in the lower end of the knife support 28 and locked in their positions by means of screws. By this design of the fastening of the knives a rapid and simple exchange is possible, if need be. As the dovetail fastening for the leading knife 29 is transversely directed, there is a certain possibility of adjusting the leading knife 29 laterally in relation to the main knife 30. The leading knife 29 is planar and has a straight edge which commences above the soil surface and makes an acute angle with said surface. The rear lower end of the edge of the leading knife lies at a certain depth beneath the soil surface (20-60 mm) and, as is apparent from FIG. 2, runs straight in front of the upper portion of the main knife 30. As is apparent from FIG. 1, the main knife 30 is elongated and directed as an extension of the knife support 28, that is, substantially at right angles to the soil surface. The edge of the main knife 30 has an upper vertical portion and a lower, gently curved portion which ends substantially straight beneath the plant row to be pruned. Moreover, the main knife is of such a length that the cutting depth for the lower portion of its edge normally lies at 60–120 mm. The lower portion of the main knife 30 further slightly tapers at the front edge so that its edge as viewed from above will in some degree incline to the transverse direction of the machine, whereby the lower knife end which is bent inwardly beneath the plant row will lie slightly rearwardly of the upper knife portion which is located straight to the rear of the leading knife. Moreover, the main knife is slightly twisted at least along the gently curve portion, whereby the rear edge of that portion of the knife which extends inwardly beneath the plant row will be situated a slightly lesser distance beneath the soil surface than its edge. This twist or clearance of the lower portion of the main knife is clearly apparent in FIG. 1 where the clearance angle is designated $\alpha$ and can suitably amount to a value less than 10°. The above described design of the main knife is specially suited for preventing plant portions getting stuck thereto. The leading knife 29 has for its object to cut off such plant portions as are located above the soil surface or immediately beneath it and to provide a groove in which the upper substantially vertical portion of the main knife shall run.

To improve or on the whole make possible the function of the knife unit 13 it has proved that in addition to the actual forward movement through the soil the knife unit has to effect rapid reciprocatory movements. It has proved most suitable for the leading knife 29 to move in such a way that its edge effects rapid reciprocatory movements in its longitudinal direction. On the other hand, the main knife 30, to ensure the best possible function, must effect rapid movements transversely of the direction of the edge, that is, back and forth in the direction of travel of the machine. These rapid reciprocatory movements are generated by the drive mechanism 26 and are transferred via the substantially horizontal connecting arm 27 to the upper end of the knife support 28. Being mounted for pivotment about a pivot axis 31 in relation to the vertically adjustable arm 20, the knife support 28 will effect a rapid pendulating movement about the pivot axis 31. As a result, the main knife which is arranged as an extension of the knife support 28, will effect a reciprocatory movement in the direction of travel of the machine, said movement thus taking place substantially at right angles to the edge of the main knife. In order that the leading knife 29 shall be given a reciprocatory movement along its edge, said leading knife is, as mentioned in the foregoing, arranged so as to make an acute angle with the soil surface, but in addition it is placed in such a way in relation to the pivot axis 31 of the knife support that the normal of the edge passes through the pivot axis 31 or at least in its immediate vicinity. To permit adjustment of the edge angle of the leading knife 29 relative to the ground and at the same time adjustment of the clearance angle $\alpha$ of the main knife, the connecting arm 27 is of variable length.

Figure 3:
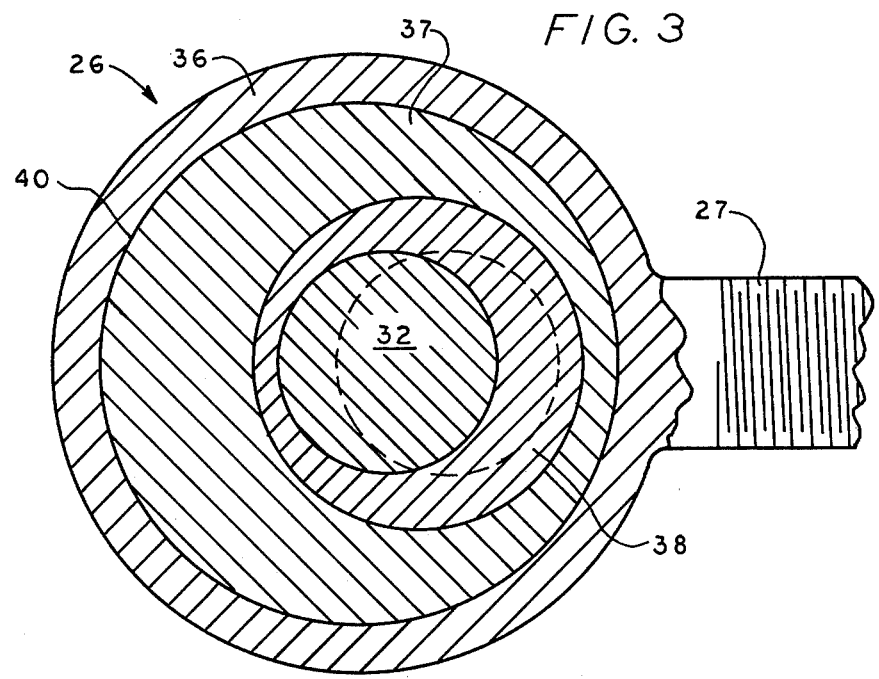
FIG. 3 is a cross-sectional view of a drive mechanism embodying the present invention for setting the knife support in rapid penulating motion.

As already mentioned, the drive mechanism 26 sets the knife support 28 in a rapid penulating movement via the connecting arm 27. The drive mechanism 26 (FIG. 3) is here formed as an eccentric mechanism, the connecting arm 27 functioning as a connecting rod. The eccentric mechanism 26 is located within the upper end of the vertical frame portion 14 and is driven by and movable along a drive shaft 32 which is mounted by suitable bearings in the vertical frame members. The drive shaft 32 has a sprocket 33 and a chain 34 (FIG. 1)

running over said sprocket and connecting the drive shaft to a corresponding sprocket of a miter wheel gearing 35. The miter wheel gearing 35 is connected via the power take-off 4 to the tractor power take-off. In normal operation, the power take-off rotates at a speed of the order 400 rpm, while the drive shaft 32 rotates at a speed of the order 750 rpm. As a result, the knife unit 13 will effect reciprocatory movements at a frequency of approximately 750 strokes per minute. To permit adjustment of the stroke length of the reciprocatory movements of the knife unit the eccentric mechanism is provided with an inner eccentric 38 which can be fastened with the aid of a clamping sleeve to the drive shaft 32 and which is accommodated in an eccentric hole in an outer eccentric ring 37, the inner eccentric 38 and the outer eccentric ring 37 being rigidly interconnectible so that they will together form an eccentric of adjustable eccentricity. A suitable bearing 40 is provided between the outer eccentric ring and the crank end 36 of the connecting arm 27. By turning the outer eccentric ring 37 relative to the inner eccentric 38 and locking it in the set position the eccentric mechanism can be so adjusted that the stroke of the knife unit varies between 10 (as represented by the shaft 32 in its solid line position) and 30 mm as represented by the shaft 32 in its dashed position, a stroke of about 20 mm being normally used.

The machine described in the foregoing is only an embodiment of the invention and can therefore be modified by one of ordinary skill in the art in several ways without going outside the boundaries of the invention. Thus, it may be suitable in some cases that the person who in the described embodiment of the machine walks after it and supervises its function and steers it laterally instead rides in a seat arranged on the machine. In this case, the steering rod 11 is of another appearance and is suitably provided within easy reach of the operator in his seat. Moreover, the adjustment device 21 may also suitably be designed in such a way as to be conveniently operable from the seat.

Even though the knife unit 13 described in the foregoing and shown in the drawings has proved to function in a very advantageous matter, the leading knife 29 may be replaced by a rotary circular knife which may either be suspended in a knife support 28 or in the vertically adjustable arm 20.

The machine described above can also to great advantage simply be used for weeding between the growing plant rows. For this purpose, the knife units only are removed and replaced by downwardly directed arms which are laterally bent such that the lower ends thereof run midway between the plant rows. At the lower ends of the arms are secured weeding knives which as viewed from above may suitably be V-shaped and directed with their apices forwardly and placed straight below the pivot axis 31. To prevent weed collecting so far downwards on the downwardly directed arms that the weeding knives or the ground is influenced, the arms are arcuately curved rearwards so that their lowermost portions heavily slope rearwardly-upwardly in a known manner, whereby the weeds will be lifted. It may also be suitable to secure, in the pruning assemblies, indicating antennae which show the lateral extension of the weeding knives, thereby to facilitate lateral steering. To prevent the wheels 23 sinking into the soil loosened by the weeding knifes, the wheels should have as large ground-engaging surfaces as possible, that is, be as wide as possible.

Although the machine is shown in a six-row embodiment with six pruning assemblies, the machine may of course have another number of such assemblies, both a lesser and a greater number.

Finally, it may also in certain circumstances be suitable to use instead of the mechanical power transmission to the drive shaft 32, for example a hydraulic power transmission. In this case a hydraulic motor driving the shaft 32 could cause the knife support to pendulate at a frequency continuously varying within a wide range. With a multi-row embodiment of the machine it is also suitable to shift the phases of the movements of the various knife supports in relation to each other, which may simply be done in such a manner that the eccentrics are angularly turned about the drive shaft 32 relative to each other so that the largest radii of the eccentrics will be substantially uniformly distributed over the circumference of the drive shaft. By this arrangement, the moment necessary for driving the knife supports 28 will be more uniformly distributed around the drive shaft 32.

What I claim and desire to secure by Letters Patent is:

1. A machine for the root-pruning of plants growing in rows, such that the root system of the plants will be small in circumference but finely-branched, the machine having for each plant row a knife unit for forming a groove in the ground and root-pruning the plants, each said knife unit comprising a first and second knife, said first knife being forward of said second knife and lying in a vertical plane parallel to the direction of travel of the machine, said second knife having a cutting blade comprising a substantially vertical blade portion and a substantially horizontal blade portion, said first and second knives being rigidly interconnected and arranged for reciprocatory movement in a direction parallel to the direction of travel of the machine, and a compactor disposed behind said second knife for reclosing the groove made in the ground by the knife unit.

2. A machine as claimed in claim 1, further comprising a knife support for securing said second knife and said first knife in common, said knife support being mounted for pivotment about a pivot axis whhich is horizontal and at right angles to the direction of travel of the machine, said first knife being planar and having an edge forming an acute angle to the horizontal in the direction of machine travel to enable the front end of said first knife edge to be located above the ground surface and the rear end thereof beneath the ground surface, said first knife being further arranged such that the normal of its edge passes in the vicinity of said pivot axis, and wherein said vertical edge portion of said second knife is situated straight behind said first knife with said horizontal edge portion being downwardly displaced from said vertical edge portion so as to be situated beneath the plants which are being root pruned.

3. A machine as claimed in claim 2, wherein said knife support comprises a substantially vertical rod having a downwardly directed extension forming said second knife and an upper portion, said machine further comprising a drive mechanism and a parallelogram suspension for the knife unit, said parallelogram suspension including a rear arm comprising said upper portion, a substantially vertical frame portion, a front portion comprising a vertically adjustable arm in which said pivot axis is secured and a connecting arm between said drive mechanism and said upper portion for imparting movement to the knife support.

4. A machine as claimed in claim 3, wherein said connecting arm is of adjustable length, whereby the angles which both knives make with the ground are simultaneously adjustable.

5. A machine as claimed in claim 3 further comprising a height adjustment device and wherein said compactor comprises a wheel secured at the rear end of the vertically adjustable arm by said height adjustment device to enable the adjustment of the cutting depth of the knife unit without any change to the cutting angles thereof.

6. A machine as claimed in claim 3, wherein the drive mechanism is an eccentric mechanism of adjustable stroke driven by a shaft disposed transversely of the machine.

7. A machine as claimed in claim 3 further comprising a drive shaft disposed transversely of the machine, wherein said drive mechanism is arranged to be driven by said drive shaft, and wherein said drive mechanism comprises adjustable eccentric means for rendering the stroke distance of movement imparted to said knife support adjustable.

8. A machine as claimed in claim 2, wherein said first knife is laterally adjustably connected to said second knife, wherein said second knife cutting blade includes, between the vertical and the horizontal blade portions, a blade portion laterally gently curved in an angle of about 90°, wherein said cutting blade of said second knife includes a cutting forward edge which is slightly curved rearwardly and makes an angle with the transverse direction of the machine, and wherein said curved and horizontal blade portions of said second knife are slightly twisted for disposing their rear edges above their cutting edges.

* * * * *